(12) United States Patent
Knoblach (10) Patent No.: US 10,059,421 B2
(45) Date of Patent: Aug. 28, 2018

(54) MULTIFUNCTIONAL BALLOON MEMBRANE

(71) Applicant: SPACE DATA CORPORATION, Chandler, AZ (US)

(72) Inventor: Gerald Mark Knoblach, Chandler, AZ (US)

(73) Assignee: SPACE DATA CORPORATION, Chandler, AZ (US)

( * ) Notice: Subject to any disclaimer, the term of this patent is extended or adjusted under 35 U.S.C. 154(b) by 74 days.

(21) Appl. No.: 14/983,119

(22) Filed: Dec. 29, 2015

(65) Prior Publication Data

US 2016/0185435 A1  Jun. 30, 2016

Related U.S. Application Data

(60) Provisional application No. 62/097,839, filed on Dec. 30, 2014.

(51) Int. Cl.
*B64B 1/40* (2006.01)
*B64B 1/58* (2006.01)
*G01W 1/08* (2006.01)
*B64B 1/62* (2006.01)

(52) U.S. Cl.
CPC ............. *B64B 1/58* (2013.01); *B64B 1/40* (2013.01); *B64B 1/62* (2013.01); *G01W 1/08* (2013.01)

(58) Field of Classification Search
CPC ... G01W 1/08; B64B 1/40; B64B 1/58; B64B 1/62; B64B 1/70
See application file for complete search history.

(56) References Cited

U.S. PATENT DOCUMENTS

| | | |
|---|---|---|
| 2,151,336 A | 3/1939 | Scharlau |
| 2,366,423 A | 1/1945 | Pear, Jr. |
| 2,462,102 A | 2/1949 | Istvan |
| 2,542,823 A | 2/1951 | Lyle |
| 2,598,064 A | 5/1952 | Lindenblad |
| 2,626,348 A | 1/1953 | Nobles |
| 2,742,246 A | 4/1956 | Mellen |
| 3,030,500 A | 4/1962 | Katzin |

(Continued)

FOREIGN PATENT DOCUMENTS

| | | |
|---|---|---|
| DE | 1188951 | 3/1965 |
| EP | 0490722 | 6/1992 |

(Continued)

OTHER PUBLICATIONS

International Search Report dated Mar. 31, 2016 in corresponding International Patent Application No. PCT/US2015/068081 (6 pages).

(Continued)

*Primary Examiner* — Richard G Davis
(74) *Attorney, Agent, or Firm* — Davé Law Group, LLC; Raj S. Davé

(57) ABSTRACT

Disclosed herein is a lighter-than-air (LTA) device and method of making the same. In an embodiment, the LTA device may include a membrane having a flexible substrate and an active material disposed thereon, wherein the active material is configured to controllably change the surface area of at least a portion of the substrate when an electrical stimulus is applied to the active material.

10 Claims, 8 Drawing Sheets

(56) References Cited

U.S. PATENT DOCUMENTS

| | | |
|---|---|---|
| 3,030,509 A | 4/1962 | Carlson |
| 3,045,952 A | 7/1962 | Underwood |
| 3,058,694 A | 10/1962 | Fazio et al. |
| 3,174,705 A | 3/1965 | Schiff et al. |
| 3,206,749 A | 9/1965 | Chatelain |
| 3,384,891 A | 5/1968 | Anderson |
| 3,404,278 A | 10/1968 | Chope |
| 3,471,856 A | 10/1969 | Laughlin, Jr. et al. |
| 3,555,552 A | 1/1971 | Alford |
| 3,674,225 A | 7/1972 | Johnson |
| 3,742,358 A | 6/1973 | Cesaro |
| 3,781,893 A | 12/1973 | Beukers et al. |
| 3,781,894 A | 12/1973 | Ancona et al. |
| RE28,725 E | 12/1976 | Hutchinson et al. |
| 4,123,987 A | 11/1978 | Singerle et al. |
| 4,249,181 A | 2/1981 | Lee |
| 4,262,864 A | 4/1981 | Eshoo |
| 4,394,780 A | 7/1983 | Mooradian |
| 4,419,766 A | 12/1983 | Goeken et al. |
| 4,457,477 A | 7/1984 | Regipa |
| 4,472,720 A | 9/1984 | Reesor |
| 4,481,514 A | 11/1984 | Beukers et al. |
| 4,509,053 A | 4/1985 | Robin et al. |
| 4,509,851 A | 4/1985 | Ippolito et al. |
| 4,589,093 A | 5/1986 | Ippolito et al. |
| 4,595,928 A | 6/1986 | Wingard |
| 4,689,739 A | 8/1987 | Federico et al. |
| 4,696,052 A | 9/1987 | Breeden |
| 4,740,783 A | 4/1988 | Lawrence et al. |
| 4,747,160 A | 5/1988 | Bossard |
| 4,868,577 A | 9/1989 | Wingard |
| 4,979,170 A | 12/1990 | Gilhousen et al. |
| 4,995,572 A | 2/1991 | Piasecki |
| 5,005,513 A | 4/1991 | Van Patten et al. |
| 5,067,172 A | 11/1991 | Schloemer |
| 5,119,397 A | 6/1992 | Dahlin et al. |
| 5,121,128 A | 6/1992 | Lidth de Jeude et al. |
| 5,123,112 A | 6/1992 | Choate |
| 5,175,556 A | 12/1992 | Berkowitz |
| 5,189,734 A | 2/1993 | Bailey et al. |
| 5,204,970 A | 4/1993 | Stengel et al. |
| 5,212,804 A | 5/1993 | Choate |
| 5,214,789 A | 5/1993 | George |
| 5,218,366 A | 6/1993 | Cardamone et al. |
| 5,235,633 A | 8/1993 | Dennison et al. |
| 5,239,668 A | 8/1993 | Davis |
| 5,287,541 A | 2/1994 | Davis |
| 5,327,572 A | 7/1994 | Freeburg |
| 5,345,448 A | 9/1994 | Keskitalo |
| 5,359,574 A * | 10/1994 | Nadolink .......... B63B 1/34 367/1 |
| 5,384,565 A | 1/1995 | Cannon |
| 5,420,592 A | 5/1995 | Johnson |
| 5,430,656 A | 7/1995 | Dekel et al. |
| 5,433,726 A | 7/1995 | Horstein et al. |
| 5,439,190 A | 8/1995 | Horstein et al. |
| 5,444,762 A | 8/1995 | Frey et al. |
| 5,455,823 A | 10/1995 | Noreen et al. |
| 5,467,681 A | 11/1995 | Liberman |
| 5,471,641 A | 11/1995 | Dosiere et al. |
| 5,488,648 A | 1/1996 | Womble |
| 5,519,761 A | 5/1996 | Gilhousen |
| 5,521,817 A | 5/1996 | Burdoin et al. |
| 5,533,029 A | 7/1996 | Gardner |
| 5,557,656 A | 9/1996 | Ray et al. |
| 5,559,865 A | 9/1996 | Gilhousen |
| 5,584,047 A | 12/1996 | Tuck |
| 5,615,409 A | 3/1997 | Forssen et al. |
| 5,645,248 A | 7/1997 | Campbell |
| 5,714,948 A | 2/1998 | Farmakis et al. |
| 5,745,685 A | 4/1998 | Kirchner et al. |
| 5,748,620 A | 5/1998 | Capurka |
| 5,759,712 A | 6/1998 | Hockaday |
| 5,761,656 A | 6/1998 | Ben-Shachar |
| 5,781,739 A | 7/1998 | Bach et al. |
| 5,788,187 A | 8/1998 | Castiel et al. |
| 5,832,380 A | 11/1998 | Ray et al. |
| 5,835,059 A | 11/1998 | Nadel et al. |
| 5,870,549 A | 2/1999 | Bobo |
| 5,899,975 A | 5/1999 | Nielsen |
| 5,907,949 A | 6/1999 | Falke et al. |
| 5,909,299 A | 6/1999 | Sheldon, Jr. et al. |
| 5,960,200 A | 9/1999 | Eager et al. |
| 5,963,128 A | 10/1999 | McClelland |
| 5,978,940 A | 11/1999 | Newman et al. |
| 5,987,432 A | 11/1999 | Zusman et al. |
| 5,992,795 A | 11/1999 | Tockert |
| 5,996,001 A | 11/1999 | Quarles et al. |
| 6,061,562 A | 5/2000 | Martin et al. |
| 6,067,579 A | 5/2000 | Hardman et al. |
| 6,097,688 A | 8/2000 | Ichimura et al. |
| 6,108,673 A | 8/2000 | Brandt et al. |
| 6,128,622 A | 10/2000 | Bach et al. |
| 6,141,660 A | 10/2000 | Bach et al. |
| 6,167,263 A | 12/2000 | Campbell |
| 6,212,550 B1 | 4/2001 | Segur |
| 6,243,737 B1 | 6/2001 | Flanagan et al. |
| 6,250,309 B1 | 6/2001 | Krichen et al. |
| 6,253,200 B1 | 6/2001 | Smedley et al. |
| 6,256,676 B1 | 7/2001 | Taylor et al. |
| 6,259,447 B1 | 7/2001 | Kanetake et al. |
| 6,289,382 B1 | 9/2001 | Bowman-Amluah |
| 6,324,398 B1 | 11/2001 | Lanzerotti et al. |
| 6,397,253 B1 | 5/2002 | Quinlan et al. |
| 6,401,136 B1 | 6/2002 | Britton et al. |
| 6,414,947 B1 | 7/2002 | Legg et al. |
| 6,446,110 B1 | 9/2002 | Lectiona et al. |
| 6,507,856 B1 | 1/2003 | Chen et al. |
| 6,507,857 B1 | 1/2003 | Yalcinalp |
| 6,510,466 B1 | 1/2003 | Cox et al. |
| 6,519,617 B1 | 2/2003 | Wanderski et al. |
| 6,529,921 B1 | 3/2003 | Berkowitz et al. |
| 6,530,078 B1 | 3/2003 | Shmid et al. |
| 6,535,896 B2 | 3/2003 | Britton et al. |
| 6,543,343 B2 | 4/2003 | Taylor |
| 6,560,639 B1 | 5/2003 | Dan et al. |
| 6,568,631 B1 | 5/2003 | Hillsdon |
| 6,589,291 B1 | 7/2003 | Boag et al. |
| 6,591,272 B1 | 7/2003 | Williams |
| 6,601,071 B1 | 7/2003 | Bowker et al. |
| 6,606,642 B2 | 8/2003 | Ambler et al. |
| 6,613,098 B1 | 9/2003 | Sorge et al. |
| 6,615,383 B1 | 9/2003 | Talluri et al. |
| 6,628,941 B2 | 9/2003 | Knoblach et al. |
| 6,643,825 B1 | 11/2003 | Li et al. |
| 6,665,861 B1 | 12/2003 | Francis et al. |
| 6,666,410 B2 | 12/2003 | Boelitz |
| 6,668,354 B1 | 12/2003 | Chen et al. |
| 6,675,095 B1 | 1/2004 | Bird |
| 6,687,873 B1 | 2/2004 | Ballantyne et al. |
| 6,697,489 B1 | 2/2004 | Carlson |
| 6,728,685 B1 | 4/2004 | Ahluwalia |
| 6,738,975 B1 | 5/2004 | Yee et al. |
| 6,753,889 B1 | 6/2004 | Najmi |
| 6,772,206 B1 | 8/2004 | Lowry et al. |
| 6,775,680 B2 | 8/2004 | Ehrman et al. |
| 6,799,299 B1 | 9/2004 | Li et al. |
| 6,810,429 B1 | 10/2004 | Walsh et al. |
| 6,816,883 B2 | 11/2004 | Baumeister et al. |
| 6,826,696 B1 | 11/2004 | Chawla et al. |
| 6,843,448 B2 | 1/2005 | Parmley |
| 6,850,979 B1 | 2/2005 | Saulpaugh et al. |
| 6,859,834 B1 | 2/2005 | Arora et al. |
| 6,874,146 B1 | 3/2005 | Lyengar |
| 6,889,360 B1 | 5/2005 | Ho et al. |
| 6,901,403 B1 | 5/2005 | Bata et al. |
| 6,901,430 B1 | 5/2005 | Smith |
| 6,904,598 B2 | 6/2005 | Abileah et al. |
| 6,907,564 B1 | 6/2005 | Burchhardt et al. |
| 6,909,903 B2 | 6/2005 | Wang |
| 6,910,216 B2 | 6/2005 | Abileah et al. |
| 6,912,719 B2 | 6/2005 | Elderon et al. |
| 6,915,523 B2 | 7/2005 | Dong et al. |
| 6,948,117 B2 | 9/2005 | Van Eaton et al. |

(56) References Cited

U.S. PATENT DOCUMENTS

| | | |
|---|---|---|
| 6,948,174 B2 | 9/2005 | Chiang et al. |
| 6,952,717 B1 | 10/2005 | Monchilovich et al. |
| 6,964,053 B2 | 11/2005 | Ho et al. |
| 6,971,096 B1 | 11/2005 | Ankireddipally et al. |
| 6,980,963 B1 | 12/2005 | Hanzek |
| 6,980,993 B2 | 12/2005 | Horvitz et al. |
| 7,000,238 B2 | 2/2006 | Nadler et al. |
| 7,013,306 B1 | 3/2006 | Turba et al. |
| 7,043,687 B2 | 5/2006 | Knauss et al. |
| 7,051,032 B2 | 5/2006 | Chu-Carroll et al. |
| 7,054,901 B2 | 5/2006 | Shafer |
| 7,058,955 B2 | 6/2006 | Porkka |
| 7,069,291 B2 | 6/2006 | Graves et al. |
| 7,080,092 B2 | 7/2006 | Upton |
| 7,093,789 B2 | 8/2006 | Barocela et al. |
| 7,107,285 B2 | 9/2006 | von Kaenel et al. |
| 7,111,011 B2 | 9/2006 | Kobayashi et al. |
| 7,120,645 B2 | 10/2006 | Manikutty et al. |
| 7,120,702 B2 | 10/2006 | Huang et al. |
| 7,124,299 B2 | 10/2006 | Dick et al. |
| 7,130,893 B2 | 10/2006 | Chiang et al. |
| 7,134,075 B2 | 11/2006 | Hind et al. |
| 7,143,190 B2 | 11/2006 | Christensen et al. |
| 7,152,205 B2 | 12/2006 | Day et al. |
| 7,181,493 B2 | 2/2007 | English et al. |
| 7,266,582 B2 | 9/2007 | Stelting |
| 7,296,229 B2 | 11/2007 | Junkermann |
| 7,341,223 B2 | 3/2008 | Chu |
| 7,398,221 B1 | 7/2008 | Bensoussan et al. |
| 7,418,508 B2 | 8/2008 | Haller et al. |
| 7,421,701 B2 | 9/2008 | Dinh et al. |
| 7,487,936 B2 | 2/2009 | Heaven |
| 7,567,779 B2 | 7/2009 | Seligsohn et al. |
| 7,590,987 B2 | 9/2009 | Behrendt et al. |
| 7,801,522 B2 | 9/2010 | Knoblach et al. |
| 8,286,910 B2 | 10/2012 | Alavi |
| 8,342,442 B1 * | 1/2013 | Dancila .............. B64B 1/26 244/128 |
| 8,718,477 B2 | 5/2014 | DeVaul et al. |
| 8,733,697 B2 | 5/2014 | DeVaul et al. |
| 8,812,176 B1 | 8/2014 | Biffle et al. |
| 8,820,678 B2 | 9/2014 | DeVaul et al. |
| 8,996,024 B1 | 3/2015 | Teller et al. |
| 9,300,388 B1 | 3/2016 | Behroozi et al. |
| 9,407,362 B2 | 8/2016 | DeVaul et al. |
| 9,424,752 B1 | 8/2016 | Bonawitz |
| 9,590,721 B2 | 3/2017 | Behroozi et al. |
| 9,714,831 B2 | 7/2017 | Kapoor et al. |
| 2001/0004583 A1 | 6/2001 | Uchida |
| 2001/0014900 A1 | 8/2001 | Brauer et al. |
| 2001/0016869 A1 | 8/2001 | Baumeister et al. |
| 2001/0032232 A1 | 10/2001 | Zombek et al. |
| 2001/0034791 A1 | 10/2001 | Clubb et al. |
| 2001/0037358 A1 | 11/2001 | Clubb et al. |
| 2001/0047311 A1 | 11/2001 | Singh |
| 2002/0010716 A1 | 1/2002 | McCartney et al. |
| 2002/0031101 A1 | 3/2002 | Petite et al. |
| 2002/0035583 A1 | 3/2002 | Price et al. |
| 2002/0038335 A1 | 3/2002 | Dong et al. |
| 2002/0038336 A1 | 3/2002 | Abileah et al. |
| 2002/0042849 A1 | 4/2002 | Ho et al. |
| 2002/0046294 A1 | 4/2002 | Brodsky et al. |
| 2002/0049815 A1 | 4/2002 | Dattatri |
| 2002/0052968 A1 | 5/2002 | Bonefas et al. |
| 2002/0056012 A1 | 5/2002 | Abileah et al. |
| 2002/0059344 A1 | 5/2002 | Britton et al. |
| 2002/0072361 A1 | 6/2002 | Knoblach et al. |
| 2002/0078010 A1 | 6/2002 | Ehrman et al. |
| 2002/0078255 A1 | 6/2002 | Narayan |
| 2002/0083099 A1 | 6/2002 | Knauss et al. |
| 2002/0099735 A1 | 7/2002 | Schroeder et al. |
| 2002/0100027 A1 | 7/2002 | Binding et al. |
| 2002/0107915 A1 | 8/2002 | Ally et al. |
| 2002/0111989 A1 | 8/2002 | Ambler et al. |
| 2002/0116454 A1 | 8/2002 | Dyla et al. |
| 2002/0133569 A1 | 9/2002 | Huang et al. |
| 2002/0143820 A1 | 10/2002 | Van Eaton et al. |
| 2002/0156930 A1 | 10/2002 | Velasquez |
| 2002/0160745 A1 | 10/2002 | Wang |
| 2002/0160805 A1 | 10/2002 | Laitinen et al. |
| 2002/0161801 A1 | 10/2002 | Hind et al. |
| 2002/0174340 A1 | 11/2002 | Dick et al. |
| 2002/0175243 A1 | 11/2002 | Black et al. |
| 2002/0178031 A1 | 11/2002 | Sorensen et al. |
| 2002/0178290 A1 | 11/2002 | Coulthard et al. |
| 2002/0178299 A1 | 11/2002 | Teubner |
| 2002/0188688 A1 | 12/2002 | Bice et al. |
| 2002/0194227 A1 | 12/2002 | Day et al. |
| 2002/0198974 A1 | 12/2002 | Shafer |
| 2003/0004746 A1 | 1/2003 | Kheirolomoom et al. |
| 2003/0007397 A1 | 1/2003 | Kobayashi et al. |
| 2003/0040273 A1 | 2/2003 | Seligsohn et al. |
| 2003/0040955 A1 | 2/2003 | Anaya et al. |
| 2003/0120730 A1 | 2/2003 | Kuno et al. |
| 2003/0046035 A1 | 3/2003 | Anaya et al. |
| 2003/0055768 A1 | 3/2003 | Anaya et al. |
| 2003/0065623 A1 | 4/2003 | Cornell et al. |
| 2003/0070006 A1 | 4/2003 | Nadler |
| 2003/0074217 A1 | 4/2003 | Beisiegel et al. |
| 2003/0078902 A1 | 4/2003 | Leong et al. |
| 2003/0081002 A1 | 5/2003 | De Vorchik et al. |
| 2003/0093403 A1 | 5/2003 | Upton |
| 2003/0093436 A1 | 5/2003 | Brown et al. |
| 2003/0093468 A1 | 5/2003 | Gordon et al. |
| 2003/0093500 A1 | 5/2003 | Khodabakchian et al. |
| 2003/0097327 A1 | 5/2003 | Anaya et al. |
| 2003/0121142 A1 | 7/2003 | Horvitz et al. |
| 2003/0126229 A1 | 7/2003 | Kantor et al. |
| 2003/0159111 A1 | 8/2003 | Fry |
| 2003/0163544 A1 | 8/2003 | Wookey et al. |
| 2003/0163585 A1 | 8/2003 | Elderon et al. |
| 2003/0167233 A1 | 9/2003 | Pledereder et al. |
| 2003/0191970 A1 | 10/2003 | Devine et al. |
| 2003/0204460 A1 | 10/2003 | Robinson et al. |
| 2003/0212686 A1 | 11/2003 | Chu-Carroll et al. |
| 2004/0006739 A1 | 1/2004 | Mulligan |
| 2004/0024820 A1 | 2/2004 | Ozzie et al. |
| 2004/0030740 A1 | 2/2004 | Stelting |
| 2004/0054969 A1 | 3/2004 | Chiang et al. |
| 2004/0064466 A1 | 4/2004 | Manikutty et al. |
| 2004/0103370 A1 | 5/2004 | Chiang et al. |
| 2004/0104304 A1 * | 6/2004 | Parmley .............. B64B 1/005 244/30 |
| 2004/0111464 A1 | 6/2004 | Ho et al. |
| 2004/0205536 A1 | 10/2004 | Newman et al. |
| 2004/0205731 A1 | 10/2004 | Junkermann |
| 2004/0205770 A1 | 10/2004 | Zhang et al. |
| 2004/0210469 A1 | 10/2004 | Jones et al. |
| 2004/0221292 A1 | 11/2004 | Chiang et al. |
| 2004/0230987 A1 | 11/2004 | Snover et al. |
| 2004/0237034 A1 | 11/2004 | Chiang et al. |
| 2005/0050228 A1 | 3/2005 | Perham et al. |
| 2005/0091639 A1 | 4/2005 | Patel |
| 2005/0165826 A1 | 7/2005 | Ho et al. |
| 2005/0165936 A1 | 7/2005 | Haller et al. |
| 2005/0166209 A1 | 7/2005 | Merrick et al. |
| 2005/0171970 A1 | 8/2005 | Ozzie et al. |
| 2005/0203944 A1 | 9/2005 | Dinh et al. |
| 2005/0210414 A1 | 9/2005 | Angiulo et al. |
| 2005/0258306 A1 | 11/2005 | Barocela et al. |
| 2005/0278410 A1 | 12/2005 | Espino |
| 2006/0063529 A1 | 3/2006 | Seligsohn et al. |
| 2006/0265478 A1 | 11/2006 | Chiang et al. |
| 2007/0083524 A1 | 4/2007 | Fung et al. |
| 2007/0084283 A1 | 4/2007 | Fung et al. |
| 2008/0263641 A1 | 10/2008 | Dinh et al. |
| 2008/0271049 A1 | 10/2008 | Dinh et al. |
| 2008/0299990 A1 | 12/2008 | Knoblach et al. |
| 2009/0189015 A1 | 7/2009 | Alavi |
| 2009/0294582 A1 * | 12/2009 | Michel .............. B64B 1/24 244/62 |
| 2010/0100269 A1 | 4/2010 | Ekhaguere |
| 2010/0131121 A1 | 5/2010 | Gerlock |
| 2010/0228468 A1 | 9/2010 | D'Angelo |

(56) References Cited

U.S. PATENT DOCUMENTS

| | | | |
|---|---|---|---|
| 2010/0292871 | A1 | 11/2010 | Schultz et al. |
| 2011/0118907 | A1 | 5/2011 | Elkins |
| 2012/0158280 | A1 | 6/2012 | Ravenscroft |
| 2012/0223181 | A1 | 9/2012 | Ciampa |
| 2013/0158749 | A1 | 6/2013 | Contorer |
| 2013/0175387 | A1* | 7/2013 | DeVaul .................. G05D 1/042 244/31 |
| 2013/0175391 | A1 | 7/2013 | DeVaul et al. |
| 2013/0177321 | A1 | 7/2013 | DeVaul et al. |
| 2014/0158823 | A1 | 6/2014 | Smith |
| 2014/0166817 | A1 | 6/2014 | Levien |
| 2014/0249693 | A1 | 9/2014 | Stark et al. |
| 2014/0284422 | A1 | 9/2014 | Sapir |
| 2014/0367511 | A1 | 12/2014 | Knoblach et al. |
| 2014/0379173 | A1 | 12/2014 | Knapp |
| 2015/0134150 | A1 | 5/2015 | Farjon |
| 2015/0160658 | A1 | 6/2015 | Reedman |
| 2015/0248711 | A1* | 9/2015 | Fournier ................ B60L 8/003 705/14.71 |
| 2016/0003620 | A1 | 1/2016 | Kapoor |
| 2016/0155338 | A1 | 6/2016 | Lynar |
| 2016/0167761 | A1* | 6/2016 | Roach ...................... B64B 1/58 244/31 |
| 2016/0189548 | A1 | 6/2016 | Thurling |
| 2016/0196750 | A1 | 7/2016 | Collins |
| 2016/0196757 | A1 | 7/2016 | Knoblach |
| 2016/0226573 | A1 | 8/2016 | Behroozi |
| 2016/0253908 | A1 | 9/2016 | Chambers |

FOREIGN PATENT DOCUMENTS

| | | |
|---|---|---|
| EP | 0837567 A2 | 4/1998 |
| EP | 1058409 | 12/2000 |
| EP | 1327580 | 7/2003 |
| EP | 2 719 719 | 4/2014 |
| EP | 2719719 | 4/2014 |
| GB | 2216319 | 10/1989 |
| GB | 2 511 447 | 9/2014 |
| GB | 2511447 | 9/2014 |
| JP | 4-43194 | 2/1992 |
| JP | H4-43194 | 2/1992 |
| JP | H0443194 | 2/1992 |
| JP | 950826 | 2/1997 |
| JP | 2001273177 | 10/2001 |
| WO | WO9504407 | 2/1995 |
| WO | WO9602094 | 1/1996 |
| WO | WO9851568 A1 | 11/1998 |
| WO | WO0101710 | 1/2001 |
| WO | WO 01/58098 | 8/2001 |
| WO | WO0167290 | 9/2001 |
| WO | 2006/108311 | 10/2006 |
| WO | 2011/148373 | 12/2011 |

OTHER PUBLICATIONS

Zang et al., "Multifunctionality and Control of the Crumpling and Unfolding of Large-Area Graphene", Nature Materials, Jan. 20, 2013, pp. 321-325.

So et al., "Reversibly Deformable and Mechanically Tunable Fluidic Antennas. Adv Funct Mater", Advanced Functional Materials, vol. 19, Nov. 2009, pp. 3632-3637.

Hu et al., "Thin, Flexible Secondary Li-Ion Paper Batteries", ACS Nano, vol. 4, No. 10, Oct. 2010, pp. 5843-5848.

Non-Final Office Action dated Feb. 14, 2017 in corresponding U.S. Appl. No. 15/351,441.

Notice of Allowance dated Apr. 13, 2017 in corresponding U.S. Appl. No. 15/434,036.

Notice of Allowance dated Feb. 17, 2017 in corresponding U.S. Appl. No. 15/351,438.

Brazillian Written Opinion dated Jan. 3, 2017 in corresponding Brazilian Patent Application No. PI0414906-8.

Part 101—Moored Balloons, Kites, Umanned Rockets and Unmmaned Free Balloons, Federal Aviation Administration, Dept. of Tranportation, 14 CFR Ch. 1, Jan. 1, 1999 Edition, pp. 304-308.

Part 101—Moored Balloons, Kites, Umanned Rockets and Unmmaned Free Balloons, Federal Aviation Administration, Dept. of Tranportation, 14 CFR Ch. 1, Jan. 1, 2000 Edition, pp. 309-313.

Part 101—Moored Balloons, Kites, Umanned Rockets and Unmmaned Free Balloons, Federal Aviation Administration, Dept. of Tranportation, 14 CFR Ch. 1, Jan. 1, 2001 Edition, pp. 307-311.

International Preliminary Examination Report dated Mar. 17, 2017 in corresponding International Patent Application No. PCT/US2015/000279.

Notice of Allowance dated May 10, 2017 in corresponding U.S. Appl. No. 15/351,441 (7 pages).

Final Office Action dated Jun. 19, 2017 in corresponding U.S. Appl. No. 14/757,426 (11 pages).

Canadian Office Action dated Jun. 29, 2017 in corresponding Canadian Patent Application No. 2885578 (4 pages).

International Preliminary Examination Report dated Jul. 6, 2017 in corresponding International Patent Application No. PCT/US2015/000278 (8 pages).

International Preliminary Examination Report dated Jul. 13, 2017 in corresponding International Patent Application No. PCT/US2015/068081.

Final Office Action dated Aug. 1, 2017 in corresponding U.S. Appl. No. 15/343,190 (9 pages).

"Attunity Connect for Mainframe, Native OS/390 Adapters to Data and Legacy," 2003, pp. 1-3.

"Connecting to IMS Using XML, SOAP and Web Services", Shyh-Mei F, Ho. IMS Technical Conference, Koenigswinter, Germany, Oct. 15-17, 2002.

"Correlate IMSADF Secondary Transaction MFS Generation with the Generation of the Output Format Rule", IBM Technical Disclosure Bulletin, vol. 27, No. 1B, pp. 623-824, Jun. 1984.

"Creating WSDL and a Proxy Client From a Web Service," www.west-wind.com/webconnection/docs/_08413NI2E.htm, 2002.

"HostBridge and We.bSpnere: Integrating CICS with IBM's Application Server," a HostBridge White Paper, Jul. 23, 2002, pp. 1-34.

"IBM Mainframe," www:dmreview.com/whitepaper/WID1002720.pdf. Mar. 18, 2005.

"IMS Connect Guide and Reference version 1," http://publibfp.boulder.ibm.com/epubs/pdf/lcgr0001.pdf, Oct. 2000, IBM.

"IMS Connect Guide and Reference", IBM et al. http://publibfp.boulder.ibm.com/epubs/pdf/hwsuga11.pdf, Oct. 2002.

"IMS Connector for Java, User's Guide and Reference", IBM VisualAge for Java, Version 3.5, 9 pages, IBM.

"IMS Follow-on Ideal for e-business", Excerpts from http://www.3.ibm.com/software/data/ims/...ntations/two/imsv7enh/HTML/indexp54.htm, IBM Corporation, 2002.

"IMS Information", Excerpts from http://www.3.ibm.com/software/data/ims/...ntations/two/imsv7enh/HTML/indexp55.htm, IBM Corporation 2002.

"Learning Management Systems XML, and Web Services," Finn Gronbaek, IBM Corporation, copyright 2001, Apr. 20, 2003, pp. 1-29.

"Leveraging IMS Applications and Data" <Excerpts from Leveraging IMS2 found at http://www.3.ibm.com/software/data/ims/...ntations/two/imsv7enh/HTML/indexp52.htm, IBM Corporation, 2002.

"MFS XML, Utility Version 9.3.0 User's Guide and Reference", 57 pages, IBM Corporation, ftp://ftp.software.ibm.com/software/data/ims/toolkit/mfswebsupport/mfsxml-v3.pdf, 2003.

"NetDynamics, PAC for IMS" User Guide, Precise Connectivity Systems, 1998.

"Quarterdeck Mosiac User Guide," 1995, Chapters 1-7.

"Remote Execution of IMS Transactions for OS/2", IBM Technical Disclosure Bulletin, vol. 34, No. 7B, pp. 16, Dec. 1991.

"Requirements for Building Industrial Strength Web Services: The Service Broker", http:www.theserverside.com/Warticles.tss?1=Service-Broker Jul. 2001.

"S1215, WWW.IMS or Websphere Working with IMS," Ken Blackman, 39 pp. (date unknown).

"Web Services Description Language (WSDL) 1." Mar. 2001, W3C.

(56) References Cited

OTHER PUBLICATIONS

"Web Services", www.webopedia.com/TERM/W/Web services. html, 2003.
"Web Services—The Next Step in the Evolution of the Web", Excerpt from http://www.3.ibm.com/software/data/ims/...ntations/two/imsv7enh/HTML/index51.htm, IBM Corporation, 2002.
"What Web Services are Not", www.webreference.com/xml/column50, 2003.
"What's Next in IMS Providing Integrated e-business Solutions: IMS Version 8," Excerpt from http://www.3.ibm.com/software/data/ims/...ntations/two/imsv7enh/HTML/indexp53.htm, IBM Corporation, 2002.
"XML and IMS for Transparent Application Integration", Excerpt from http://www.3.ibm.com/software/data/ims/...ntations/two/imsv7enh/HTML/indexp50.htm, IBM Corporation, 2002.
"XML Schema Pad 2: Datatypes" 2001, W3C <http://www.w3.org/TR/2001/PR-xmischema-2-20010330>.
Application Development/Enablement, http://www.306.ibm.com/software/data/ims/presentation/five/trends2003/HTML/indexp15.htm, Oct. 11, 2003.
Arndt et al., An XML-Based Approach to Multimedia Software Engineering for Distance Learning, Acm 2002, pp. 525-532.
Blackman, "IMS eBusiness Update", IMS V8 Roadshow, 11 pages, IBM Corporation, http://www-306ibm.com.software/data/ims/shelf/presentation/oneday/IMSeBusinessUpdate2003.pdf, 2003.
Component of the Week: XMI Toolkit:, Jun. 1, 2001 http://www-106.ibm.com/developerworks/library/co-cow21.html.
Cover et al., "Web Services User Interface (WSUI) Initiative", http://xml.coverpages.org/wsui.html, Oct. 29, 2002.
Cover, Robin et al. Web Services for Interactive Applications (WSIA). [Web Services Component Model (WSCM)], http://xml.coverpages.org/wscm, Jan. 21, 2002, printed Oct. 31, 2007, 4 pages.
Cronje, "Absa Uses VGR to Ensure Online Availability", www-306.ibm.com/software/data/ims/quarterly/Winter2000/winter.htm.
Crouch et al., "Balloon and Airship" Compton's Interactive Encyclopedia, 5 pages excerpt, 1993-1994.
David A. Brown "Balloon Technology Offers High-Altitude Applications" Aviation Week & Space Technology, Nov. 16, 1992, pp. 56-57.
Diaz et al., Inter-Organizational Document Exchange—Facing the Conversion Problem with XML, ACM 2002, pp. 1043-1104.
Djuknic. G. M. et al, (1997) "Establishing Wireless Communications Services via High-Altitude Aeronautical Platforms: A Concept Whose Time Has Come?," IEEE Communictions Magazine 35(9):128-135.
Dymetman at al., XML and Multilingual Document Authoring: Convergent Trends, ACM Jul. 2000, pp. 243-249.
Extended European Search Report dated Aug. 1, 2006, for patent application No. 0502604035, 7 pages.
Extensible Markup Language (XML) 1.0 (Second Edition) Oct. 2000, W3C.
Gavan, J. (1996) "Stratospheric Quasi-Stationary Platforms: (SQ-SP) Complementary toRadio Satellite Systems," Electrical and Electronics Engineers in Israel, 1996, Nineteenth Convention of 283-286.
Giushko et al., An XML Framework for Agent-Based E-Commerce, ACM Mar. 1999, pp. 106-114.
Google Search for IMS OnDemand SOA IMS MFS Web Solution [retrieved Dec. 17, 2009 at http://www.google.com/search?hl=en$source=hp&qMFS+MID+MOD+DIF+DOF&aq . . . ].
Hase, Y. et al. (1998) "A Novel Broadband All Wireless Access Network Using Stratospheric Plaforms" VTC 1191-1194.

Hofstetter, The Future's Future: Implications of Emerging Technology for Special Education Program Planning, Journal of Special Education Technology, Fail 2001, vol. 16, p. 7, 7 pgs.
Huang et al., Design and Implementation of a Web-based HL7 Message Generation and Validation System, Google 2003, pp. 49-58.
James Martin, "Principles of Object-Oriented Analysis and Design," Oct. 29, 1992, Chapters 1-22.
Jantti, Jouko et al., "Solutions for IMS Connectivity", http://www-1.ibm.com/support/docsview.wss?uid=swg27009024&aid=1, Feb. 2006.
Jouko Jantti et al., "IMS Version 9 Implementation Guide", ibm.com/redbooks, pp. 139-443.
Long et al. "IMS Primer" Jan. 2000, IBM, Chapter 18.
Microfocus International "DBD, PSB and MFS Statements," 2001, available at <http://supportline, microfocus.com/documentation/books/mx25sp1/imdbds.htm> as of Jun. 16, 2009.
Microsoft Corp, Computer Dictionary, Third Edition, Microsoft Press, 1997, p. 371.
Mraz, Stephen J. (1998) "Nanosatellites Head for the Launch Pad" Machine Design 70(13):38, 42, 44, 46.
Office Action from U.S. Patent and Trademark Office for U.S. Appl. No. 12/168,451, dated May 10, 2011.
Office Action from U.S. Patent and Trademark Office for U.S. Appl. No. 12/169,486, dated Feb. 1, 2012.
OMG XML Metadata Interchange (XMI) Specification, Jun. 2000, OMG, v1.0.
Parr et al., Distributed Processing Involving Personal Computers and Mainframe Hosts, IEEE 1985, pp. 479-489.
PR Newswire, Sterling Commerce Announces Availability of First Data Transformation Engine to Support Both XML and Traditional EDI Standards, ProQuest May 12, 1999, pp. 1-3.
PR Newswire, XMLSolutions Delivers XML-based Prototype for Envera Marketplace, ProQuest, Apr. 2000, pp. 1-3.
Royappa, Implementing Catalog Clearinghouses with XML and XSL, ACM 1998, pp. 616-623.
Starkey, "XML-Based Templates for Generating Artifacts from Java-Based Models," Research Disclosure, Dec. 1998, pp. 1678-1680.
Stieren, SST: Using Single-sourcing, SGML, and Teamwork for Documentation, ACM 1999, pp. 45-52.
Suzuki et al., Managing the Software Design Documents with XML, ACM 1999, pp. 127-136.
UMLTM for EAI. UMLTM Profile and Interchange Models for Enterprise Application Integration (EAI). OMG document No. ad/Sep. 17, 2001.
Wong, Web services and Enterprise Application Integration, Google Jun. 2002, pp. 1-57.
Final Office Action dated Aug. 1, 2017 in related U.S. Appl. No. 15/343,190.
International Preliminary Report on Patentability and then Written Opinion of the International Searching Authority issued in International Patent Application No. PCT/US2015/000278, dated Jul. 6, 2017.
International Preliminary Report on Patentability and then Written Opinion of the International Searching Authority issued in International Patent Application No. PCT/US2015/068081, dated Jul. 13, 2017.
Canadian Office Action dated Jun. 29, 2017 in corresponding Canadian Patent Application No. 2885578.
Final Office Action dated Jun. 19, 2017 in corresponding U.S. Appl. No. 14/757,426.

* cited by examiner

MULTIFUNCTIONAL BALLOON MEMBRANE

CROSS-REFERENCE TO RELATED APPLICATIONS

This application claims benefit under 35 U.S.C. § 119(e) from U.S. Provisional Application No. 62/097,839, filed Dec. 30, 2014, which is incorporated herein by reference in its entirety.

TECHNICAL FIELD

This disclosure relates generally to materials used for making balloon membranes.

BACKGROUND ART

Balloons can be used for putting unmanned equipment in upper atmosphere. High-altitude balloon have been used for gathering weather data. More recently, there have been attempts for providing network and communication services using high-altitude balloons. Generally, the size of balloon is determined by the desired height and the payload accompanying the balloon. As the utility of the balloons increases in complexity, so does the weight of the payload accompanying the balloon. For example, a balloon designed to provide communication services would be accompanied by a payload including, among other things, one or more antennas, power supply electronics, energy storage, and electronics designed to provide communication services. As the payload size increases, the balloon size must also increase, leading to higher cost of launch. Moreover, regulation from government agencies such as the Federal Aviation Administration (FAA) may limit the weight payload allowed to be attached to a balloon. As such, balloon membranes that can perform multiple functions are desirable.

SUMMARY

Among other things, this disclosure provides embodiments of systems and methods for assuring compliance of lighter-than-air devices carrying payloads with aviation regulations.

In an embodiment, a lighter-than-air (LTA) device is described. The device may include a membrane comprised of a flexible substrate; and an active material disposed on at least a portion of the flexible substrate, wherein the active material is configured to controllably change the surface area of at least a portion of the flexible substrate when an electrical stimulus is applied to the active material.

In various embodiments, other active materials may be incorporated within, or disposed on the membrane and/or the flexible substrate.

BRIEF DESCRIPTION OF DRAWINGS

In the present disclosure, reference is made to the accompanying drawings, which form a part hereof. In the drawings, similar symbols typically identify similar components, unless context dictates otherwise. Various embodiments described in the detailed description, drawings, and claims are illustrative and not meant to be limiting. Other embodiments may be used, and other changes may be made, without departing from the spirit or scope of the subject matter presented herein. It will be understood that the aspects of the present disclosure, as generally described herein, and illustrated in the Figures, can be arranged, substituted, combined, separated, and designed in a wide variety of different configurations, all of which are contemplated herein.

DETAILED DESCRIPTION

Before the present methods and systems are described, it is to be understood that this disclosure is not limited to the particular processes, methods and devices described herein, as these may vary. It is also to be understood that the terminology used herein is for the purpose of describing the particular versions or embodiments only, and is not intended to limit the scope of the present disclosure which will be limited only by the appended claims. Unless otherwise defined, all technical and scientific terms used herein have the same meanings as commonly understood by one of ordinary skill in the art.

It must also be noted that as used herein and in the appended claims, the singular forms "a", "an", and "the" include plural reference unless the context clearly dictates otherwise. Thus, for example, reference to an "antenna" is a reference to one or more antennas and equivalents thereof known to those skilled in the art, and so forth. Nothing in this disclosure is to be construed as an admission that the embodiments described in this disclosure are not entitled to antedate such disclosure by virtue of prior invention. As used in this document, the term "comprising" means "including, but not limited to."

As used herein, the term "lighter-than-air device", interchangeably used with the terms "LTA device", "balloon", "ballooncraft", or "unmanned ballooncraft", refers to a device that has an average density less than that of air at the sea-level. Therefore, buoyant forces pushing an LTA device up are greater than its gravitational pull. An LTA device, therefore, rises if allowed to freely float.

A "free-floating platform" as used herein refers to a platform freely floating in earth's atmosphere without substantial control over longitudinal or latitudinal movement. A free floating platform, in various embodiments, may include an LTA gas enclosure and a payload.

As used herein, "float location" of an LTA device refers to the location with respect to earth's surface (e.g., latitude and longitude coordinates, and such) at which the LTA device is floating in the earth's atmosphere. "Float altitude" refers to the height with respect to sea level, at which the LTA device is floating.

"Rise rate", interchangeably used with the term "ascent rate" of the LTA device refers to the rate at which the LTA device rises in the earth's atmosphere. Ascent rate is typically measured in feet/minute or meters/minute. Likewise, "descent rate" refers to the rate at which the LTA device descends from the earth's atmosphere towards the earth's surface.

"Aircraft", interchangeably used with the term "powered aircraft", as used herein refers to a "heavier-than-air" machine that is able to fly by gaining support from the air and has a source of mechanical power available for steering or propulsion.

As used herein, a processor refers to a machine for data processing. For example, the processor could be a microprocessor chip.

Unmanned lighter-than-air ballooncraft have been used for many years to perform tasks such as near space research and meteorological measurements. Such ballooncraft have even carried payloads with instrumentation that sometimes includes radio transmission capabilities.

Figure 1:
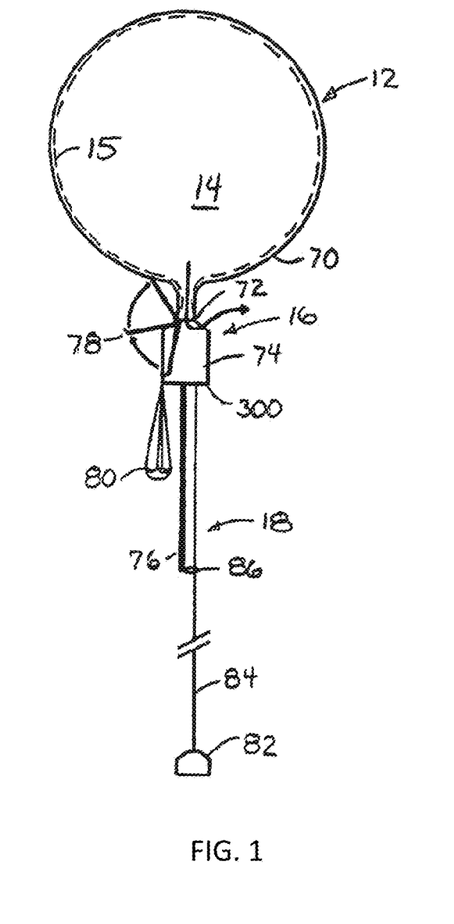
FIG. 1 shows a schematic side elevation view of a lighter-than-air platform, according to an embodiment.

FIG. 1 shows a schematic side elevation view of a lighter-than-air platform 12 in an embodiment in which the low-density gas enclosure 70 is preferably a latex balloon 70. A Totex 1000 balloon filled with hydrogen and internally coated to reduce hydrogen diffusion adequately provides lift for the free-floating platform. The Totex balloon is released with a diameter of about five and one-quarter feet and expands to about twenty-four feet across at 140,000 feet altitude. It will be noted that other lighter-than-air enclosures, such as blimps, aerostats, zeppelins, airships, dirigibles, weather balloons, jimspheres, hot air balloons, sounding balloons or meteorological balloon might also be used in place of the proposed latex weather balloon 70. It is expected that a total platform weight, including the payload box 300, altitude control vent mechanism 72, meteorological package 82, antennae 76 and meteorological cable connection 84. Preferably the cable 84 is a fiberoptic cable having a length of approximately 25 meters so that the meteorological data collection package 82 is sufficiently distanced from the balloon 70 to reduce to a minimum the effect of turbulence caused by the balloon on the meteorological data sensed by the meteorological package 82. The fiberoptic cable 84 is used to transmit the meteorological data from meteorological package 82 to the communications unit 74. Fiberoptic cable is used as wire would arc due to the high electric field potential when passing through thunderclouds.

There are numerous types of low-density gas enclosure devices, and particularly balloons, that might be considered useful for the devices and systems described herein. Among the potentially preferred types of balloons are rubber pressure balloons, zero pressure balloons, internal air bladder balloons, adjustable volume balloons and super pressure balloons. Each type of these balloons has different advantages and disadvantages and, for purposes of presently disclosed embodiments, it has been found that the rubber pressure balloon is most preferred and the zero pressure balloon is also considered a preferred alternative.

The rubber pressure balloons have a stretchable rubber membrane containing the lifting gas that allows the balloon to increase in size as the external air pressure decreases as the balloon rises. This is the most common type of weather balloon and is also consistent with party balloons. The primary advantage is the low cost and common accessibility so that high quality balloons of this type, such as weather balloons, are available at low cost. These balloons are somewhat fragile and they have delicate handling requirements and also low extended reliability. Further, the use of such balloons requires venting of the lifting gas to prevent bursting upon reaching maximum altitudes.

The zero pressure balloons consist of an initially loose bag, usually made from a plastic such as polyethylene or Mylar. As the external air pressure decreases, the bag increases in volume. Once the bag reaches its whole volume, gas must be vented or the balloon will burst as the bag material does not stretch. Although this type of balloon may be more reliable than the rubber balloons and provide less diffusion of the lifting gas, it is of a median cost, more costly than the rubber balloons, currently between about four to ten times more expensive. Thus, although the rubber balloon might be more preferred for purposes of low cost platforms, the zero pressure balloon also provides a useful enclosure for lifting the platform up and has certain advantages over the rubber pressure balloons.

Internal air bladder balloons consist of a flexible balloon containing air enclosed in a fixed volume balloon contain a lifting gas. Air is pumped into the inner-flexible balloon, which compresses the lifting gas trapped in the fixed volume balloon, thereby decreasing the overall lift. Air is let out of the inner-flexible balloon to increase lift. Blimps adjust lift using this principle. This type of balloon has certain advantages as there is no lift gas lost when reducing lift and it is potentially more reliable than rubber balloons, however it is more costly due to extra balloon, pump and extra required power for operating the increase and decrease of lift mechanism.

Adjustable volume balloons consist of a fixed volume containing the lifting gas and a mechanical way of reducing the volume of the balloon. By decreasing the volume, the lifting gas is compressed and the lift decreases. The volume may be reduced any number of ways, including an adjustable line inside the balloon from the top of the balloon volume decreases. This has less diffusion of the lifting gas, theoretically, lifting gas is not lost when reducing lift and it may be more reliable than rubber balloons. However, it has a significantly more costly due to the mechanical volume reducing mechanism and further, requires extra power for operation of such a mechanical volume-reducing mechanism.

Super pressure balloons have a fixed volume. They are called super pressure balloons because they do not expand to match the decreasing exterior pressure. They are built strong enough to hold the increased pressure. The balloons can achieve extremely long float lives because they do not need to vent gas to prevent bursting and they typically have very low membrane gas diffusion. This type of balloon is the highest cost, although one of the most reliable, with little loss of lifting gas. The extreme high cost and difficulty of manufacture and the lack of developed technology regarding such balloons, indicates that other alternatives are currently more attractive.

In various embodiments, the payload may include, without limitation: communication electronics such as one or more antennas and routers; one or more processors; one or more batteries; one or more power supplies; an on-board data storage such as a memory; one or more photovoltaic cells or panels; radar system(s); a positioning system such as a global positioning system or a star-tracking system; motion sensors such as accelerometers, magnetometers, gyroscopes, etc.; optical systems such as lights, video and/or still cameras; environmental sensors for measuring e.g., pressure, humidity, temperature, altitude, and/or windspeed; an altitude control system; a launch and/or recovery window prediction system; a payload splitting system; and the like.

Figure 2:
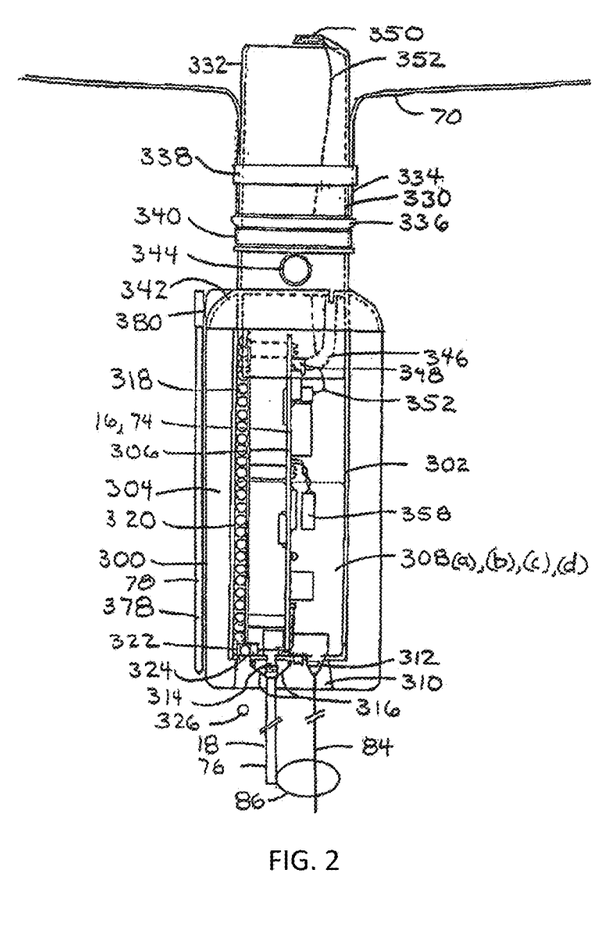
FIG. 2 depicts a schematic of a payload box carried by an LTA platform according to an embodiment.
Figure 2A:
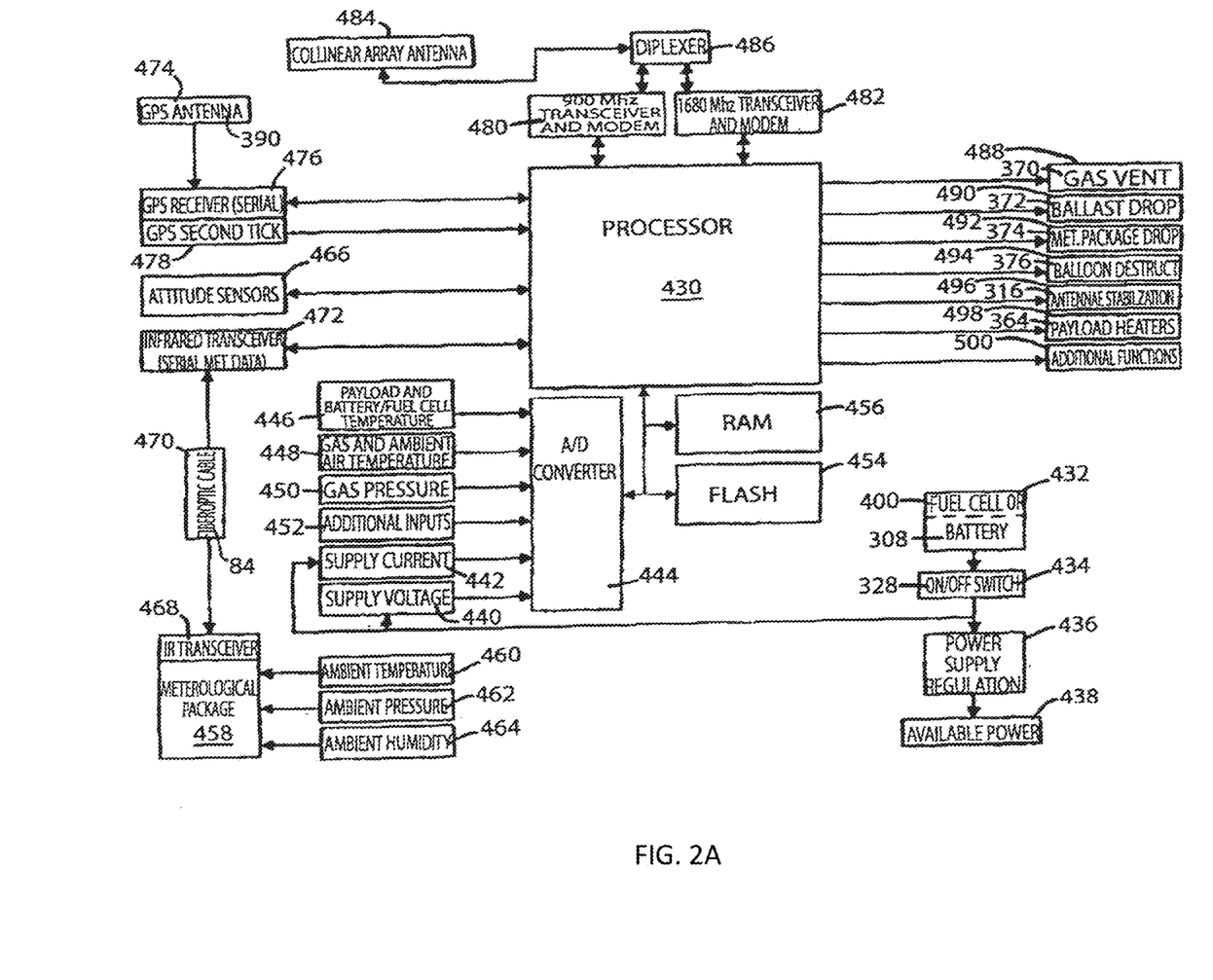
FIG. 2A depicts a schematic block diagram of the hardware contained within the payload box and placed on or interconnected with circuit board, according to an embodiment.

Embodiment in FIG. 2 depicts a payload box and FIG. 2A depicts a schematic block diagram of the hardware contained within the payload box and placed on or interconnected with circuit board. A processor 430 receives electrical signal input and provides electrical signal output, interacting with a plurality of components for both controlling the flotation altitude, temperature, balloon destruction, ballast drop, etc. of the platform and also for receiving, processing and transmitting communication signals received and transmitted to and from ground stations, personal communication devices or other information communications. Initially, block 432 represents either the batteries 308 or the fuel cell 400. Block 434 represents the on/off switch 328 to activate providing power to a power supply regulation circuit 436 with output available power 438. For clarity, individual power connections to various operational and control devices have not been shown in all instances. Power is provided to the supply voltage sensor at block 440 and current supply sensor block 442, which provide information to an analog to digital converter 444. The analog to digital converter also variously receives information from the payload and battery fuel cell temperature gauge at block 446, both gas and ambient air temperature readings at block 448 and gas pressure at block 450. Additional analog informational signals are generally represented by block 452. Digitally converted information is variously provided to and received from flash memory at block 454 and random access memory (RAM) at block 456. From A/D converter 444 and also from the flash memory 454 and from RAM memory 456, the processor has access to all the various input control data. During the ascent of the LTA device, the meteorological package represented by block 458 receives appropriate weather information including ambient temperature 460, ambient pressure at 462 and ambient humidity at 464. The antenna stabilization 316 represented by block 496 may rely upon the attitude sensor information that is part of the LTA device control system at 466 to stabilize the antenna 76. Information sensed or gathered by the meteorological package 458 is transmitted. For example, the infrared transceiver 468 through a fiber optic cable at block 470 corresponding to the physical fiberoptic cable 84 and a processor infrared transceiver 472 by which serial meteorological data is transferred to the processor 430 for appropriate transmission to ground terminals during the ascent of the LTA device with the meteorological package 458 attached. A GPS antennae block 474, corresponding to physical GPS antennae 390, communicates through a GPS receiver 476, indicated as a serial port and further synchronized with a GPS clock or seconds tick at block 478. Thus, the position at particular times is provided to the processor. This positioning information is coordinated with the other meteorological input for determining wind speeds steering any part of the ascent, thereby corresponding those wind speeds to particular altitudes and geographical locations during the ascent.

Communications are controlled by processor 430, preferably using both a 900 MHZ transceiver and modem 480 and a Gateway transceiver and modem 482 signal to and from co-linear array antennae 484 are interfaced through a diplexer 486 control information received at co-linear array antennae 484, therefore transferred through the diplexer and one of the appropriate frequency transceivers to the processor 430 with input information from ground signals and also from input information from the onboard sensors as provided through A/D converter 444, the GPS position information from 476, the GPS time information 478 and the attitude sensor information 466, various functions of the LTA device can be controlled. Including the gas vent at block 488 corresponding to the gas vent actuator 370. Also the ballast drop is controlled at block 490 corresponding to the physical ballast drop actuator 372. The meteorological package drop controlled schematically at block 492 corresponding to the package drop actuator 374. The balloon destruct control is depicted at block 494 corresponding to the destruct actuator 376. Antennae stabilization may be affected according to controls at block 496 corresponding to the antennae stabilization mechanism 316. Payload temperature controls, both heating and cooling, may be controlled at block 498 corresponding to heaters and coolers 364. Additional functions as may be additionally included, are provided with controls at block 500.

It will be apparent to one skilled in the art that depending on the purpose of the LTA device, the payload can be fairly heavy. The Federal Aviation Administration (FAA) has limited the weight of ballooncraft payload to 6 pounds unless they follow strict reporting, launching, location reporting, and lighting guidelines. These limitations may be found in the FAA CFR Title 14, Part 101. Launches are not allowed through broken cloud layers, and aircraft transponders must be carried. These restrictions would not allow for launches through all weather conditions as would be required for robust and time-sensitive missions. The transponder and lighting requirements would take up over half the weight requirement, leaving little for the mission payload weight.

The Federal Communications Commission (FCC) prohibits uncontrolled transmitters as they may cause interference to users on the same frequency or others on nearby frequencies. FCC spectrum licenses generally prohibit a US licensed transmitter from transmitting when it leaves the border of the US.

It has been found that most lighter-than-air platforms that maintain altitude must drop ballast in order to maintain altitude as lifting gas is lost through the balloon membrane and as the heating effect of the sun is lost as night approaches. The Federal Aviation Administration (FAA) regulations Section 101.7 states that unmanned ballooncraft are prohibited from dropping objects or operation such that a hazard may occur.

Sec. 101.7 Hazardous Operations.

(a) No person may operate any moored balloon, kite, unmanned rocket, or unmanned free balloon in a manner that creates a hazard to other persons, or their property.

(b) No person operating any moored balloon, kite, unmanned rocket, or unmanned free balloon may allow an object to be dropped there from, if such action creates a hazard to other persons or their property.

(Sec. 6(c), Department of Transportation Act (49 U.S.C. 1655(c)))

[Doc. No. 12800, Amdt. 101-4, 39 FR 22252, Jun. 21, 1974]

A major factor influencing the size and cost of a lighter-than-air platform is the weight of the payload. For small ballooncraft such as weather balloons, they may become exempt from certain FAA reporting, lighting, and launching requirements if the total payload weight is kept below 6 pounds and a density of 3 ounces or less per square inch of the smallest side.

Sec. 101.1 (4) Applicability.

This part prescribes rules governing the operation in the United States, of the following:

...

(4) Except as provided for in Sec. 101.7, any unmanned free balloon that—

(i) Carries a payload package that weighs more than four pounds and has a weight/size ratio of more than three ounces per square inch on any surface of the package, determined by dividing the total weight in ounces of the payload package by the area in square inches of its smallest surface;

(ii) Carries a payload package that weighs more than six pounds;

[Doc. No. 1580, 28 FR 6721, Jun. 29, 1963, as amended by Amdt. 101-1, 29 FR 46, Jan. 3, 1964; Amdt. 101-3, 35 FR 8213, May 26, 1970]

Presently, the problem described is solved by (a) limiting payload weight and density to be exempt from FAR 10, which significantly limits the payload weight and density; (b) meeting the requirements of FAR 101, which is expensive, requires reporting of each flight, a transponder and power supply, has lighting requirements, limits the launches to daytime, and other restrictions that would severely impact operations; or (c) applying for a waiver, which have generally only been granted for specific flights, and not large groups of flights.

All commercial aircraft, all instrument flight rules (IFR) aircraft, all aircraft operating in Class B or C airspace, and all aircraft operating above 18,000 feet are required to carry an aviation transponder. Every time a transponder-equipped aircraft is "painted" by FAA radar, the transponder transmits its current altitude and identification code. This allows the radar to determine not only the aircraft's position, but also the aircraft altitude and identification.

Disclosed herein are devices, systems and methods for reducing the payload weight on an LTA device to assure compliance with aviation regulations. In one embodiment, the one or more of the components that are typically carried with the LTA device in its payload are designed to be part of the LTA gas enclosure (e.g., balloon membrane). In some embodiments, the LTA gas enclosure is configured to work as an altitude control device by incorporating, in at least a portion of the LTA gas enclosure, an active material that is configured to controllably change its surface area.

In an embodiment, the LTA gas enclosure may be made from a flexible material such as latex rubber, silicone, or other suitable elastomers.

In an embodiment, the flexible material is biaxially stretched along its surface to prepare a pre-stretched substrate that. The biaxial stretch may be applied symmetrically or asymmetrically along both axes. Large area graphene sheets are then disposed on both sides of the pre-stretched substrate surface using any suitable method known in the art such that the elastomer is sandwiched between the graphene sheets. The graphene sheets may be disposed on the entire pre-stretched substrate or only on a portion of the substrate. The pre-stretched substrate is then allowed to relax.

An electrical connection suitable for applying large voltages is provided to the graphene sheets. When a voltage is applied to the graphene sheets, the elastomer substrate develops an electric field that induces Maxwell stress in the graphene sheets. The Maxwell stress deforms the graphene sheets by reducing their thickness and increase its area. The area of the graphene sheets is increased by up to 100% under Maxwell stress. The deformation of graphene sheets is reversible and the graphene sheets are restored to their original surface area when the voltage is removed.

Figure 3:
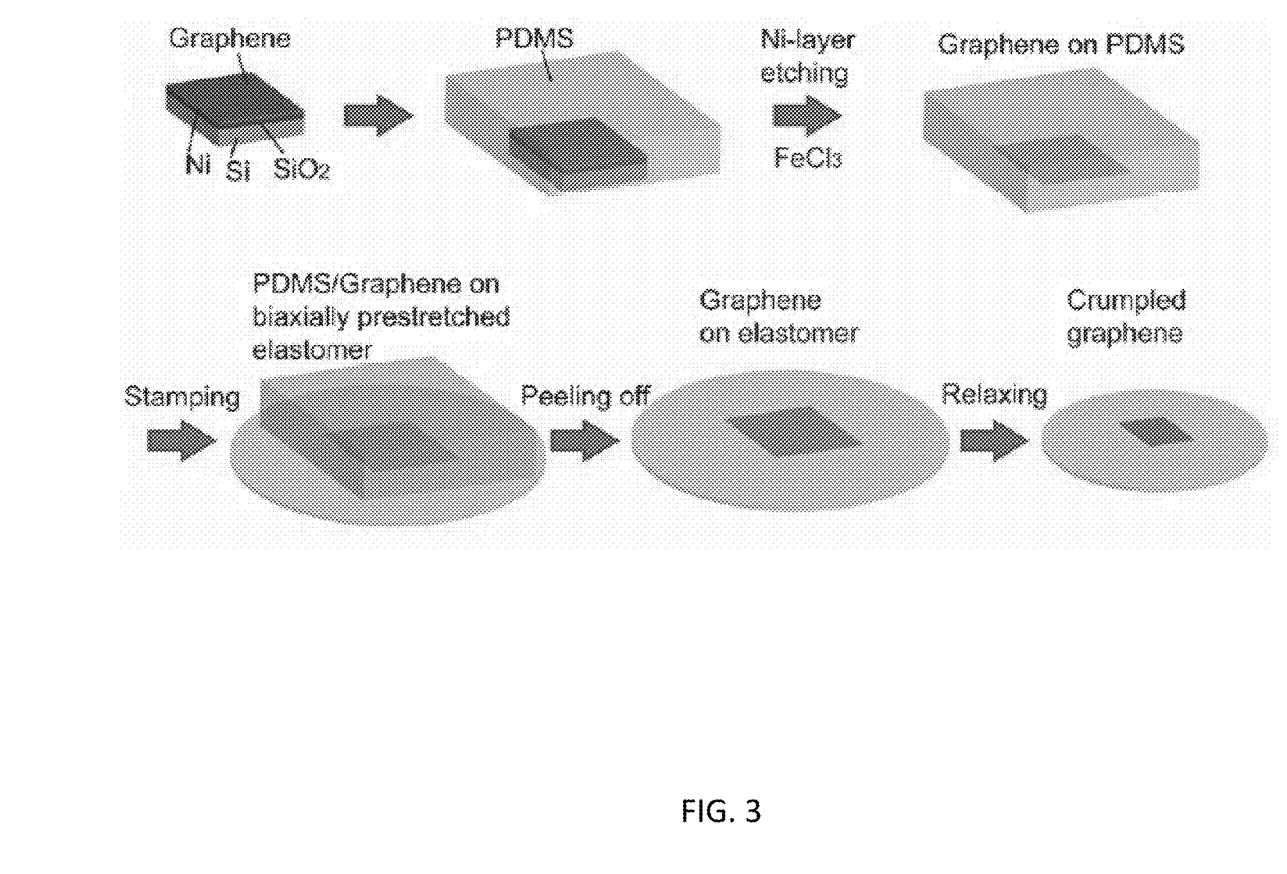
FIG. 3 schematically depicts the process of disposing the graphene sheets on the pre-stretched elastomer, according to an embodiment.

In an embodiment, layers of graphene films are grown on nickel films on silicon wafers using chemical vapor deposition. A polydimethyl siloxane (PDMS) stamp is adhered to the graphene film on the wafer. The graphene film with the PDMS stamp is detached from the wafer by etching off the nickel film using, e.g., a $FeCl_3$ solution. The graphene/PDMS sample is then rinsed by, e.g., isopropanol and deionized water, dried in, e.g., air or nitrogen gas. This is followed by stamping the cleaned graphene/PDMS on a biaxially stretched elastomer film, e.g., VHB acrylic film, to transfer the graphene film to the elastomer film. Thereafter, the pre-strains in the elastomer film are relaxed sequentially along the two pre-stretch axes. The method for making the active material for enclosing the LTA gas is described in detail by Zhao, et al ("Multifunctionality and control of crumpling and unfolding of large-area graphene", Nature Materials, 2013, pp 321-325). FIG. 3 schematically depicts the process of disposing the graphene sheets on the pre-stretched elastomer.

Figure 4:
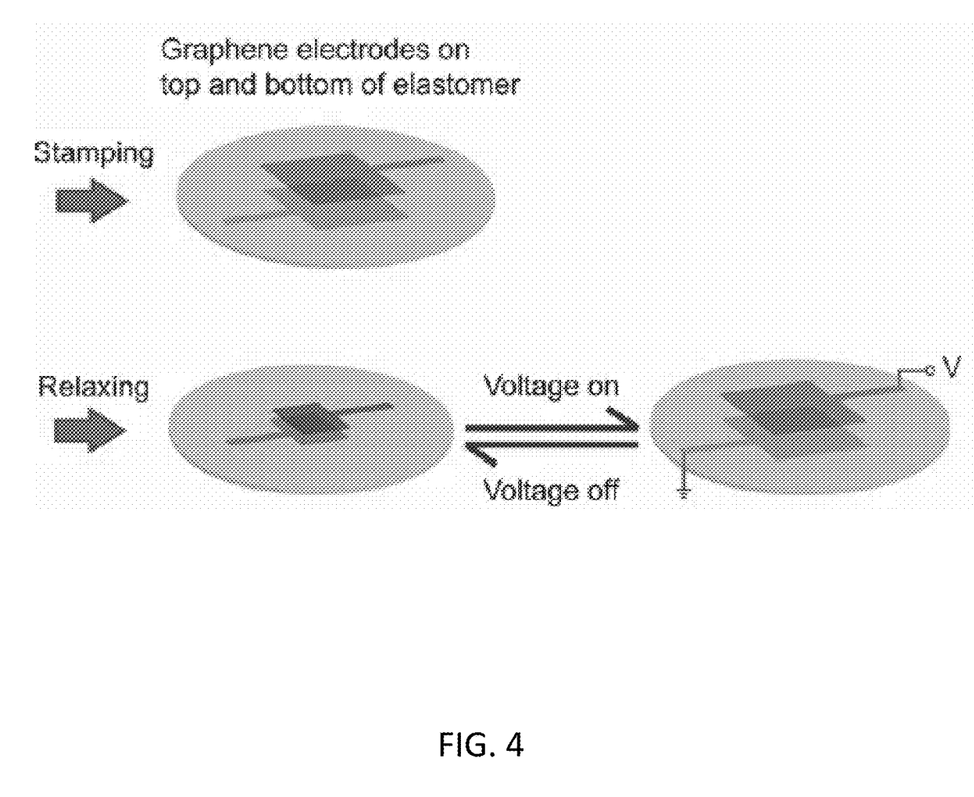
FIG. 4 schematically depicts the change in surface area of a pre-stretched elastomer sandwiched between graphene electrodes upon application of voltage, according to an embodiment.

A high-voltage supply with controllable ramping rate can be used apply high voltage between the top and bottom graphene electrodes (as shown in FIG. 4). Under high voltage, the electric field produced by the elastomer deforms the graphene sheets such that their surface area increases leading to stretching of the elastomer. When the voltage is removed, the graphene sheets are restored to their original size.

Figure 5:
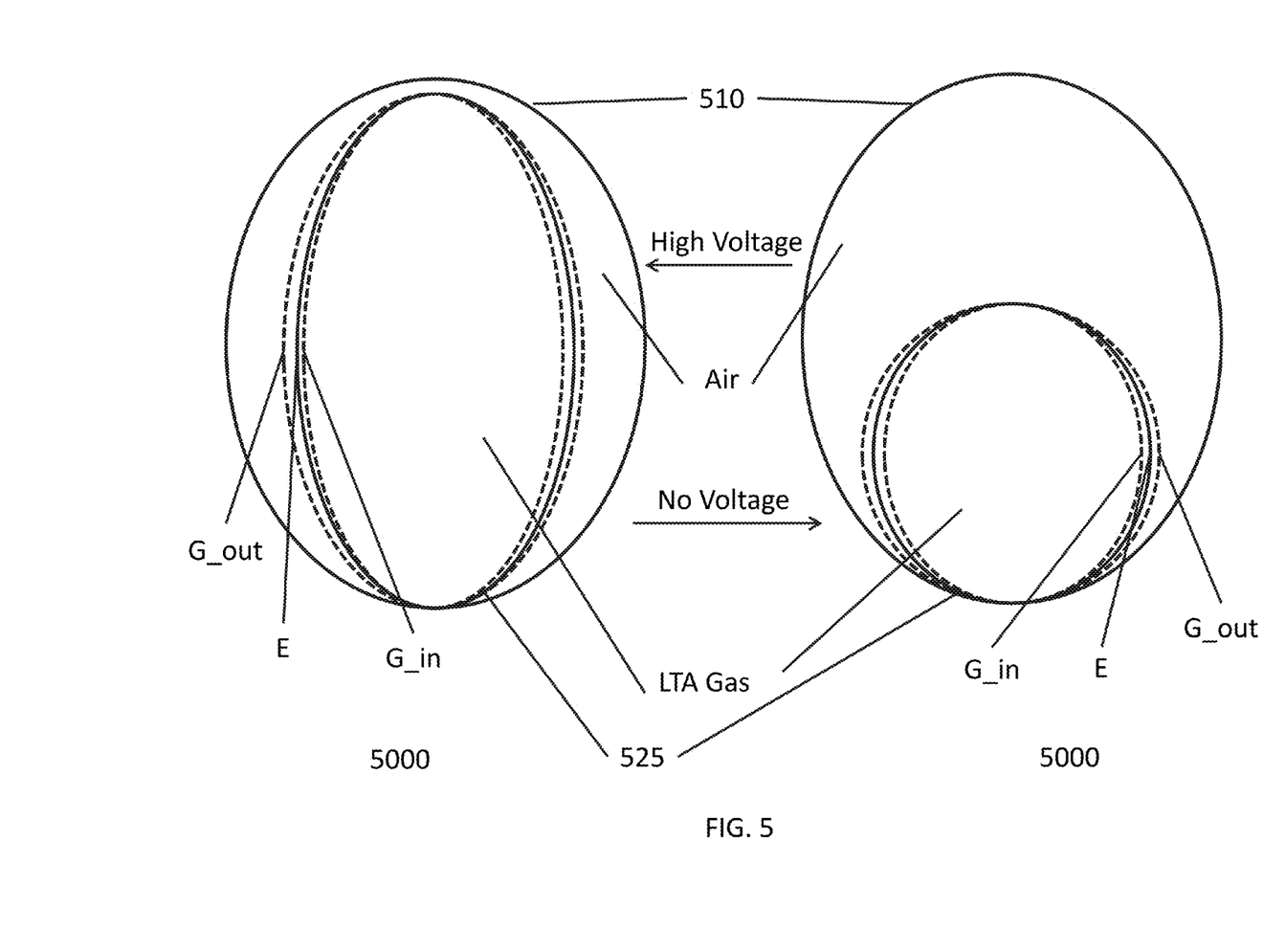
FIG. 5 schematically depicts an embodiment of a balloon having a gas enclosure with an active surface.

FIG. 5 schematically depicts an embodiment of a balloon having a gas enclosure with an active surface. The LTA device 5000 is made up of an enclosure 510 which encloses a space filled with Air and an active surface enclosure 525. Active surface enclosure 525 encloses a lighter-than-air (LTA) gas (e.g., helium or hydrogen) and is made three layers: (i) an outer graphene membrane, G_out; (ii) an elastomer membrane, E; and (iii) an inner graphene membrane, G_in.

When a high voltage is applied to graphene membranes G_in and G_out, an electric field is formed across elastomer E, thereby increasing the surface area graphene membranes G_in and G_out as seen in the left illustration in FIG. 5. This allows the LTA gas to expand, thereby decreasing the average density of the LTA device and increasing its buoyancy, allowing it to ascend. When the voltage is removed, the graphene membranes G_in and G_out return to their original size, compress the LTA gas and increases the average density of the LTA device, decreasing its buoyancy and allowing to descend. Increase or decrease in the volume of enclosure 525 is controlled by controlling the applied voltage.

Graphene provides certain advantages over other technologies for active surface control materials. For example, coating a substrate with graphene increases the hydrophobicity of the substrate. Additionally, the graphene has significantly higher transparency compared to other similar materials. While embodiments described herein use graphene to control the surface area of enclosure 525, it will be apparent to one skilled in the art that similar structures can be made using other materials such as, for example, flexible metallic electrodes, conductive polymers, indium tin oxide (ITO), carbon nanotubes, shape memory alloys, high thermal expansion coefficient materials, piezoelectric materials, electroactive polymers, or any similar material. The methods for making an area controllable surface using these methods may vary and will be known to the skilled artisan.

A skilled artisan will recognize that enclosure 525 as described herein is structured as a capacitor and therefore, can also be used for storing electrical energy. For example, if the payload includes a panel of solar cells, the electrical energy generated by the solar cells can be stored in the capacitor formed by enclosure 525. Naturally, one of the drawbacks of this approach is that as more and more electrical energy is stored in enclosure 525, the buoyancy of the LTA device increases. Thus, the dual-purpose nature of such a structure may not be ideal for certain embodiments. However, such a structure can be suitably modified to optimize its energy storage and altitude control function.

In some embodiments, an additional similar to enclosure 525 may be included within the LTA device enclosure 510 with different structural materials. For example, the for the additional structure material for elastomer membrane E may be replaced by a non-elastomeric, non-stretchable flexible dielectric material such as polyethylene, or polypropylene in a relaxed state such that there is no volume change with a voltage is applied. Other modifications of the structure will be apparent to the skilled artisan.

In various embodiments, other components typically included in the payload may be incorporated within or as part of enclosure 510. For example, in an embodiment, one or more antennas may be formed by printing thin conducting structures on enclosure 510. Obviously, these conducting structures will be connected to other electrical components of the payload using electrical wires that may also be printed on enclosure 510.

In an embodiment, the conducting structures may be made from any suitable materials, e.g., metals such as aluminum, silver, gold and the like; doped silicon or other doped semiconductors; doped metal oxides; conducting polymers; or nanotubes and nanowires or various material such as carbon, zinc oxide, indium doped tin oxide, and the like. The various conducting material may be textured for allowing flexibility.

In other embodiments, the conducting structures may be liquid metallic alloys, e.g., eutectic gallium indium alloy or Galinstan, enclosed in elastomeric microfluidic channels. In such embodiments, microfluidic channels are formed in elastomeric polymers such as PDMS, and filled with liquid metallic alloys to form stretchable or flexible antennas and interconnects.

Figure 6:
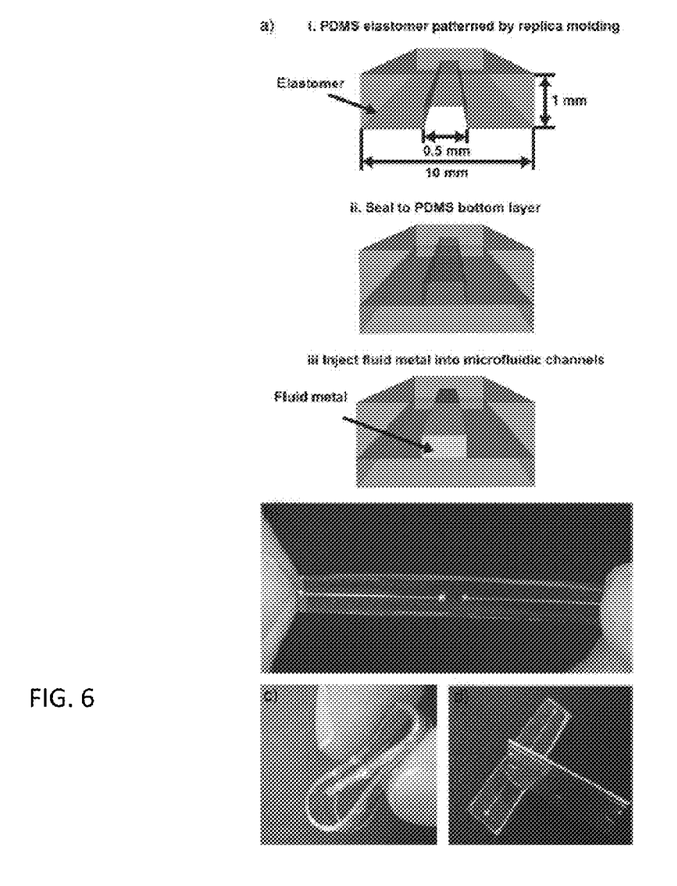
FIG. 6 schematically shows an embodiment of a stretchable antenna.

FIG. 6 schematically shows an embodiment of a stretchable antenna. FIG. 6(*a*) shows the fabrication process of a dipole antenna. PDMS elastomer cured on a topographically patterned substrate produces two adjacent microfluidic channels (only one shown). After sealing the PDMS channels with another a layer of PDMS, injection of liquid metal alloy into the microfluidic channels produces a dipole antenna as shown in FIG. 6(*b*) and FIG. 6(*c*). The process is described in detail by Dickey, et al ("Reversibly deformable and mechanically tunable fluidic antennas", Advanced Functional Materials, 2009, 19, pp. 3632-3637). Such antennas and interconnects can be stretched up to a strain of 40%.

Naturally, as such an antenna is stretched the resonant frequency of the antenna will change. This property of stretchable antennas may or may not be useful in the context of the LTA device disclosed herein.

One of the drawbacks of such an approach is that these conducting structures may conduct unwanted charges the payload electronics when the LTA device may be passing through or near an electrically charged cloud. This can be ameliorated, for example, by modifying enclosure 510 to use a multi-layered material to construct enclosure 510. The conducting structures can then be printed on one of the interior layers. Other modifications will be apparent to one skilled in the art.

In an embodiment, enclosure 510 may be modified to be a multi-layer membrane and one of the layers may be formed as a flexible secondary electrochemical battery. For example, one of the layers may be formed as a flexible lithium ion battery using paper as separator and free-standing carbon nanotube thin films as current collectors. In such an embodiment, the current collectors and lithium ion battery material are integrated on to a single sheet of paper using a lamination process. The paper functions as both, a mechanical substrate and a separator membrane with low impedance.

Figure 7:
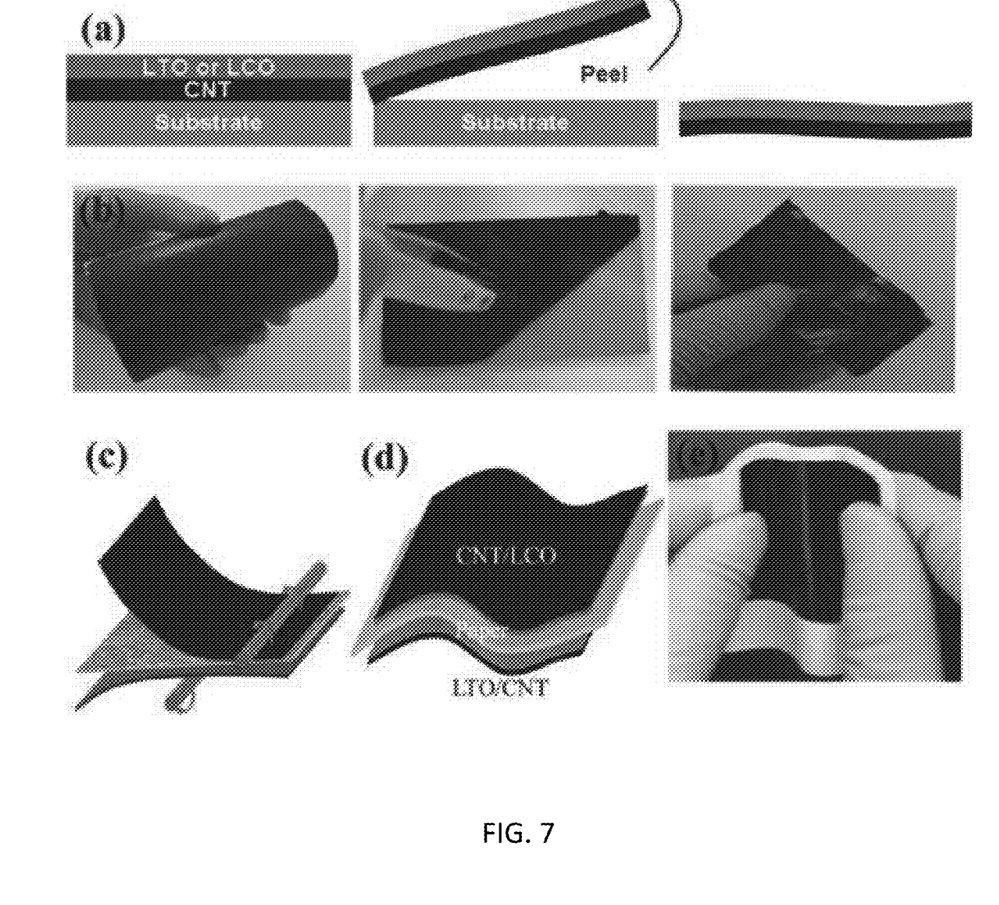
FIG. 7 schematically depicts the process for forming the lithium-ion paper battery.

The process for forming the lithium-ion paper battery is shown schematically in FIG. 7. Carbon nanotube (CNT) thin films are coated on a stainless steel (SS) substrate using a solution based process. For example, aqueous CNT dispersion can be prepared with a suitable surfactant such as sodium dodecylbenzenesulfonate and applied to the SS substrate. Upon drying the dispersion forms a thin film on the SS substrate. A slurry of battery materials, e.g., containing $Li_4Ti_5O_{12}$ (LTO) or $LiCoO_2$ (LCO) with Super P carbon and polyvinylidene fluoride (PVDF) binder in N-methyl-2-pyrrolidone, is applied to the CNT/SS substrate using a suitable method, e.g., doctor blade method (see FIG. 7(*a*), left pane). The slurry/CNT layer is then peeled off from the SS substrate, for example by immersing in water (see FIG. 7(*a*), central pane). FIG. 7(*b*) shows the slurry/CNT layer in various forms. Separately, a binder solution, e.g, containing PVDF, is coated on a substrate formed from commercially available paper and the CNT/slurry layer is laminated on the paper such that binder coated side of the paper substrate faces the slurry side of the CNT/slurry layer. The second side of the paper substrate is similarly laminated with another CNT/slurry layer to form the battery. FIG. 7(*c*) shows the lamination process. FIG. 7(*d*) shows the schematic of the Li-ion paper battery. The process is described in detail by Cui, et al ("Thin, flexible secondary Li-ion paper batteries," ACS Nano, 2010, pp. 5843-5848).

A flexible battery can be formed into any desired shape. For example, the flexible battery can be formed as one of the multiple layers of enclosure 510. While, an enclosure using thin flexible lithium-ion battery is described herein, any other suitable flexible battery may be used for constructing the enclosure. For example, a $Zn-MnO_2$ battery may be used. A skilled artisan will know the various thin flexible batteries that can be constructed as one of the layers of enclosure 510.

In yet other embodiments, one of the multiple layers of enclosure 510 may be formed as a flexible photovoltaic cell or panel. For example, in an embodiment, photovoltaic (PV) structures are coated on an ITO coated plastic substrate (e.g., polyethylene terephthalate or PET). The PV structures may include, for example, poly[2-methoxy-5-(3',7'-dimethyloctyloxy)-1,4-phenylenevinylene] (MDMO-PPV) forming the p-type material; phenyl-C61-butyric acid methyl ester (PCBM) forming the n-type material of the PV diode; ITO forming the cathode; and aluminum forming the anode material. Other suitable flexible PV structures may be used.

In an embodiment, an LTA device such as a superpressure balloon may be formed using a multi-layer construction for its balloon membrane. The outermost layer is formed from a suitable structural material such as polyethylene (PE) or PET. A second inner layer forms a flexible photovoltaic cell. A third inner layer forms a battery for storing the energy generated by the flexible photovoltaic layer. A fourth inner layer is formed from another suitable structural material and has printed thereon, electronic components such as antennae and connecting wires. A fifth inner layer is formed as the flexible LTA gas enclosure as disclosed herein. In such an embodiment, there may or may not be air or other gases between subsequent layers and the various layers (except the LTA gas enclosure) may or may not change their respective surface areas as the pressure outside the balloon increases or decreases while the balloon moves up or down in the earth's atmosphere.

In another embodiment, the outermost layer of the LTA device enclosure 510 may be colored in two colors, a first portion being colored in a first color and a second portion being colored in a second color. The first and/or second colors may be chosen to have different heat absorption coefficients. For example, the first color could be white and the second color could be black. If the LTA device is rotated such that the portion colored in black faces the sun, the heat absorbed by the portion of enclosure 510 increases the temperature of the gas enclosed by enclosure 510, thereby increasing the buoyancy of the LTA device allowing it to ascend.

The foregoing detailed description has set forth various embodiments of the devices and/or processes by the use of diagrams, flowcharts, and/or examples. Insofar as such diagrams, flowcharts, and/or examples contain one or more functions and/or operations, it will be understood by those within the art that each function and/or operation within such diagrams, flowcharts, or examples can be implemented, individually and/or collectively, by a wide range of hardware, software, firmware, or virtually any combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

All references, including but not limited to patents, patent applications, and non-patent literature are hereby incorporated by reference herein in their entirety.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A lighter-than-air (LTA) device comprising a balloon comprising an outer enclosure and an active surface enclosure located inside the outer enclosure, the active surface enclosure being made of a material comprising:
    a flexible substrate; and
    an active material disposed on at least a portion of the flexible substrate, wherein the active material deforms mechanically on application of electrical stimulus across the active material, wherein disposal of the active material on the portion controllably changes the surface area of at least the portion of the flexible substrate when an electrical stimulus is applied to the active material.

2. The LTA device of claim 1, wherein the active material comprises one or more layers of graphene, a shape memory alloy, a high thermal expansion coefficient material, a piezoelectric material, an electroactive polymer, or any combination thereof.

3. The LTA device of claim 1, wherein at least a portion of the balloon further comprises a photovoltaic material disposed thereon.

4. The LTA device of claim 1, wherein at least a portion of the balloon further comprises a conductive material disposed thereon.

5. The LTA device of claim 1, wherein at least a portion of the balloon further comprises a device that stores electrical energy disposed thereon.

6. The LTA device of claim 5, wherein the device comprises a capacitor.

7. The LTA device of claim 5, wherein the device comprises an electrochemical cell.

8. The LTA device of claim 1, wherein at least a portion of the balloon further comprises an antenna disposed thereon.

9. The LTA device of claim 1, wherein a first portion of the balloon is colored in a first color and a second portion of the balloon is colored in a second color having a heat absorption coefficient different from the first color.

10. The balloon of claim 1, wherein the active surface enclosure is filled with a first gaseous material and the region between the outer enclosure and the active surface enclosure is filled with a second gaseous material, wherein the first gaseous material is lighter than air.

\* \* \* \* \*